United States Patent [19]

Russell et al.

[11] Patent Number: 5,086,821
[45] Date of Patent: Feb. 11, 1992

[54] AIRCRAFT WHEEL

[75] Inventors: Donald L. Russell, New Carlisle; Michael P. Kahrs, Troy, both of Ohio

[73] Assignee: The B. F. Goodrich Company, Akron, Ohio

[21] Appl. No.: 468,511

[22] Filed: Jan. 23, 1990

[51] Int. Cl.⁵ ............................................. B60B 25/18
[52] U.S. Cl. ..................................... 152/410; 152/409
[58] Field of Search ............... 152/409, 410, DIG. 10; 301/13 SM, 36 R

[56] References Cited

U.S. PATENT DOCUMENTS

| | | |
|---|---|---|
| 3,599,698 | 8/1971 | Skehan et al. . |
| 3,623,530 | 11/1971 | Beyers et al. . |
| 3,645,316 | 2/1972 | Verdier . |
| 3,882,919 | 5/1975 | Sons, Jr. et al. ............... 152/410 |
| 3,995,676 | 12/1976 | Casey . |
| 4,043,375 | 8/1977 | Casey . |
| 4,209,052 | 6/1980 | French . |
| 4,438,797 | 3/1984 | Suckow . |
| 4,530,387 | 7/1985 | Osawa . |
| 4,552,194 | 11/1985 | Brown et al. . |
| 4,554,961 | 11/1985 | Osawa et al. . |
| 4,574,859 | 3/1986 | Smith . |
| 4,635,695 | 1/1987 | Frank et al. ............... 152/410 |
| 4,649,978 | 3/1987 | McCoy . |
| 4,683,930 | 8/1987 | Elam et al. . |
| 4,706,723 | 11/1987 | Loeber et al. ............... 152/410 |
| 4,721,142 | 1/1988 | Foster . |
| 4,911,216 | 3/1990 | Yamoto et al. ............... 152/410 |

FOREIGN PATENT DOCUMENTS

| | | | |
|---|---|---|---|
| 0166701 | 7/1986 | Japan ............... | 301/36 R |
| 2111921 | 7/1983 | United Kingdom ............... | 152/410 |

*Primary Examiner*—Russell D. Stormer
*Attorney, Agent, or Firm*—Joseph Januszkiewicz

[57] ABSTRACT

An annular locking ring for use on an aircraft wheel that has a pair of separable wheel sections wherein the locking ring has a lobe section and a leg section. The cross-sectional shape of the leg section has a pair of spaced linear portions that are interconnected at their one ends while the cross-sectional shape of the lobe section has a curvilinear portion and a linearly extending portion that intersects one of the linear portions of the leg section. The curvilinear portion of the lobe section has one end that merges with the other one of the spaced linear portions. The extension of the one linear portion of the leg section makes an acute angle with the linear portion of the lobe portion. Alternatively, the lobe section may have two spaced linear portions separated by the curvilinear portion with one of such linear portions merging with one linear portion of the leg section and with the other one of such linear portions of the lobe section intersecting the other linear portion of the leg section.

25 Claims, 4 Drawing Sheets

AIRCRAFT WHEEL

BACKGROUND OF THE INVENTION

This invention relates to an aircraft wheel and more particularly to a new and improved aircraft wheel structure having a locking ring or lockring that distributes the stress loading.

In the mounting of a pneumatic tire on the wheel of an aircraft, it is necessary to provide a lightweight wheel assembly to minimize overall weight. One accepted wheel assembly for such purpose is a two piece structure that utilizes a wheel base and side rim member that are secured together by a lock ring. The wheel base and side rim member would each have a recess, which when disposed opposite each other define a groove that receives the lock ring. The inflated tire on such wheel or wheel assembly would exert via its spaced beads the necessary forces to keep the wheel base and the side rim separated with the lock ring absorbing such force and transmitting the force to the wheel base of the wheel or wheel assembly. Where the wheel weight was not a great factor in the overall aircraft weight problem, it was only necessary to add bulk to the wheel assembly to absorb the increased forces. However as increased landing speeds and greater cruising distances became important factors in aircrafts it became imperative to reduce the overall weight and bulk of aircraft wheels and their components.

One major problem encountered in the wheel or wheel assembly area of aircraft with the increased demand on performance standards was that excessive wear and fretting would occur on the surface of the wheel base and the lock ring due to the rocking of the lock ring within the groove. In addition cracks would develop within the wheel base or side rim member eminating from the groove that received the lock ring. The present invention is directed to an improvement in the lock ring configuration to distribute the forces encountered between inflated tire and wheel base and side rim that is connected thereto to eliminate such cracking or excessive wear.

SUMMARY OF THE INVENTION

An annular locking ring for use on an aircraft wheel assembly that is composed of two separable wheel members with each wheel member having a rim member for abutment by the beads of an inflatable tire. The one wheel member has a circumferentially extending groove that can register with a recess in the other wheel member to receive the locking ring. The cross sectional shape of the locking ring includes a lobe and leg section, with the lobe section having a curvilinear portion that is complimentary to the groove in the one wheel member and to the recess in the other wheel member. The curvilinear portion of the lobe terminates into at least two linear portions with one linear portion being coincident with the upper or outer radial linear portion of a leg section while the other linear portion (lower linear portion) of the lobe intersects the lower or innermost radial linear portion of the leg section. The curvilinear portion locks the wheel assembly by abutting the groove and the recess to transfer forces to the lower linear portion of the locking ring and the complimentary linear portion of the circumferentially extending groove in the one wheel member. Alternatively, the lobe section of the locking ring may have a linear portion that registers with a linear portion on the recess portion in the other wheel member.

DETAILED DESCRIPTION

Figure 1:
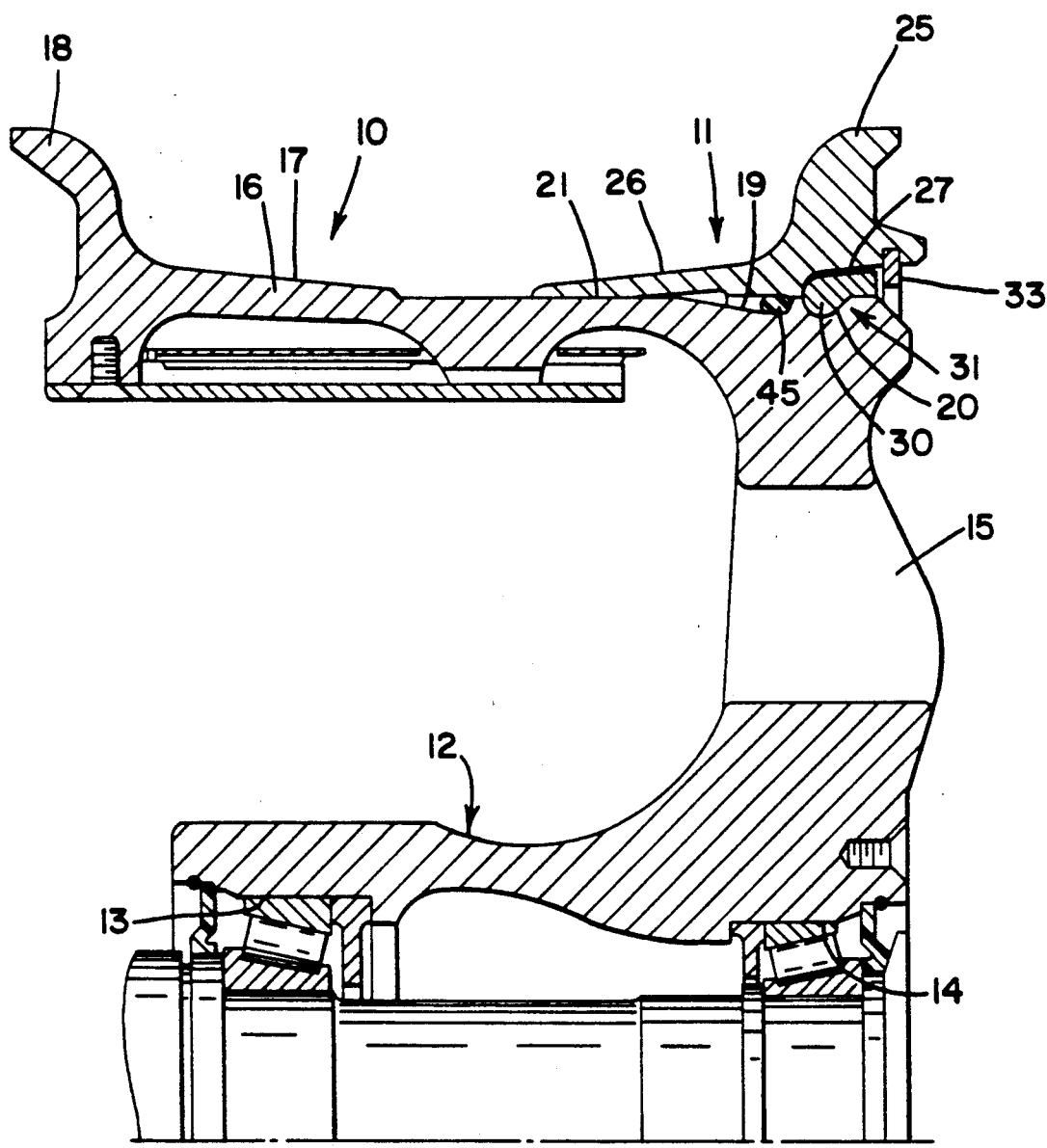
FIG. 1 is a cross-sectional view of one-half of an aircraft wheel embodying the invention.

Referring to the drawing, wherein like reference numerals designate like or corresponding parts throughout the several views, there is shown in FIG. 1 an aircraft wheel for mounting on a nonrotatable axle 9.

Such aircraft wheel has a cylindrical wheel base 10 and a cylindrical side rim 11 which supports a tire (not shown) thereon. Wheel base 10 has a cylindrical hub portion 12 with a pair of axially spaced annular recesses 13 and 14 that receive suitable bearings for supporting the wheel for rotation on the axle 9. Wheel base 10 has a web portion 15 that extends radially outwardly from one side of the hub portion 12 and terminates into an axially extending tube well or cylindrical wheel section 16. Such web section 15 can be a solid radially extending section or have a plurality of circumferentially spaced recess to define spokes that interconnect the cylindrical wheel section 16 to the hub 12.

Figure 2:
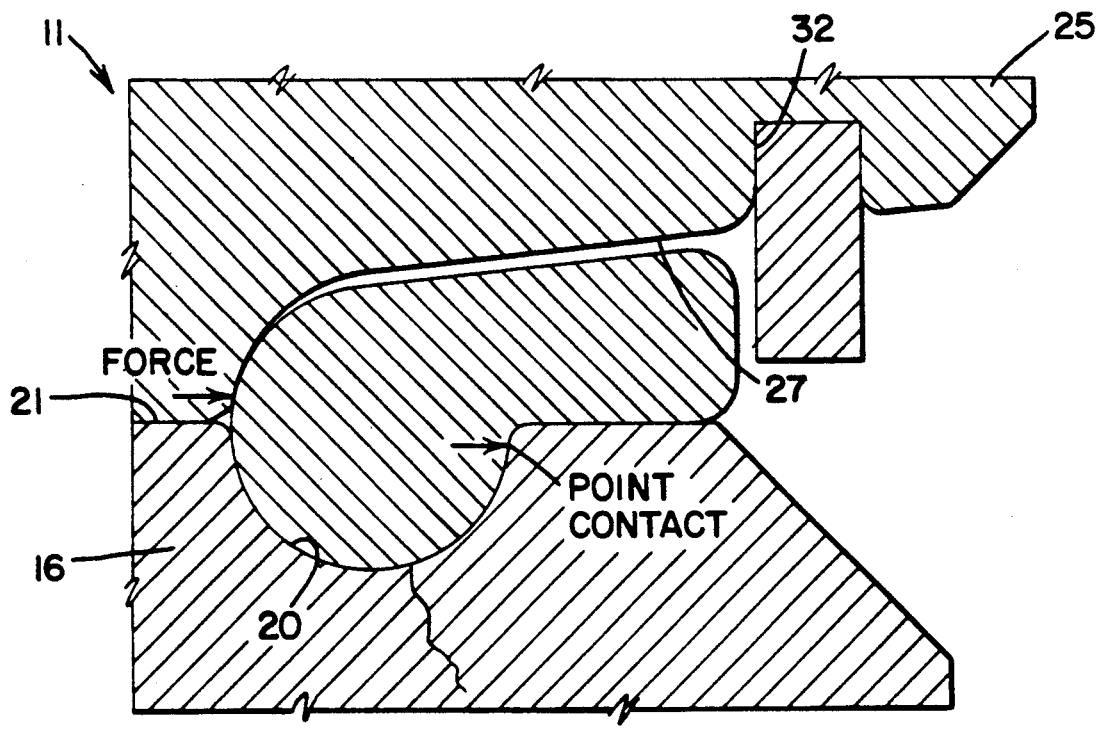
FIG. 2 is an enlarged cross-sectional view of a portion of the wheel base and side rim with a lock ring in place of a prior art structure.

Cylindrical wheel section 16 has an outer annular surface 17 that tapers outwardly from its mid section towards one edge portion that forms an annular rim member 18. The outer annular surface 17 is generally cylindrical from its mid section to its other edge portion opposite to the rim section 18 except for a pair of circumferentially extending grooves 19 and 20 adjacent to such other edge portion. The generally cylindrical portion is designated 21 in FIGS. 1 and 2.

The cylindrical side rim 11 has an annular rim member 25 that terminates into an annular axially extending leg portion 26 that tapers inwardly. The annular rim member 25 is recessed as at 27 along its radial innermost diameter for a purpose to be described. The innermost portion of such recess 27 is curved to compliment the annular groove 20 to complementary receive an annular shaped portion 30 of a lock ring 31.

The annular rim section 25 has a circumferentially extending groove 32 (FIGS. 2 and 3) that is adjacent to the recessed portion 27 for the reception of a snap ring 33 to retain the lock ring 31 in place until the forces of the inflated tire seats the lock ring in position. On inflation of the tire, the tire beads tend to separate the respective rim sections 18 and 25 as is old and well known in the art.

Lock ring 31 is an annular one piece metal strip that is split to permit its enlargement and placement over the cylindrical section 21 of wheel base 10 and upon release, springs back for seating into annular groove 20.

Figure 3:
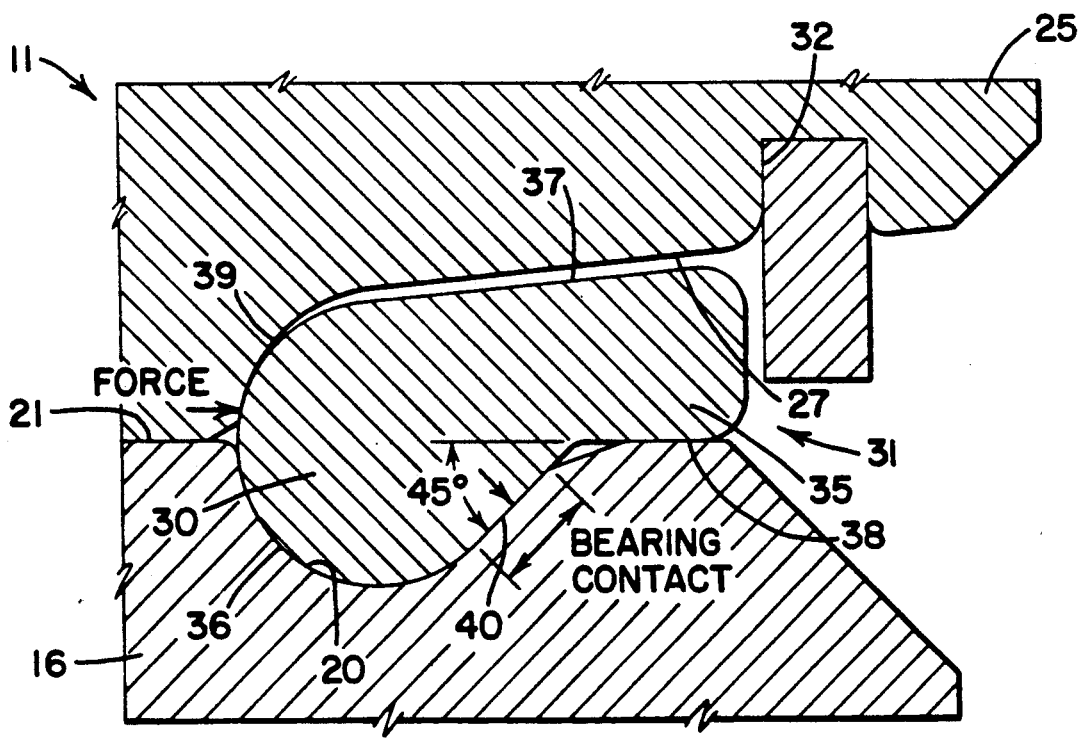
FIG. 3 is an enlarged cross-sectional view of a portion of the wheel base and side rim with new and improved lock ring in place.
Figure 4:
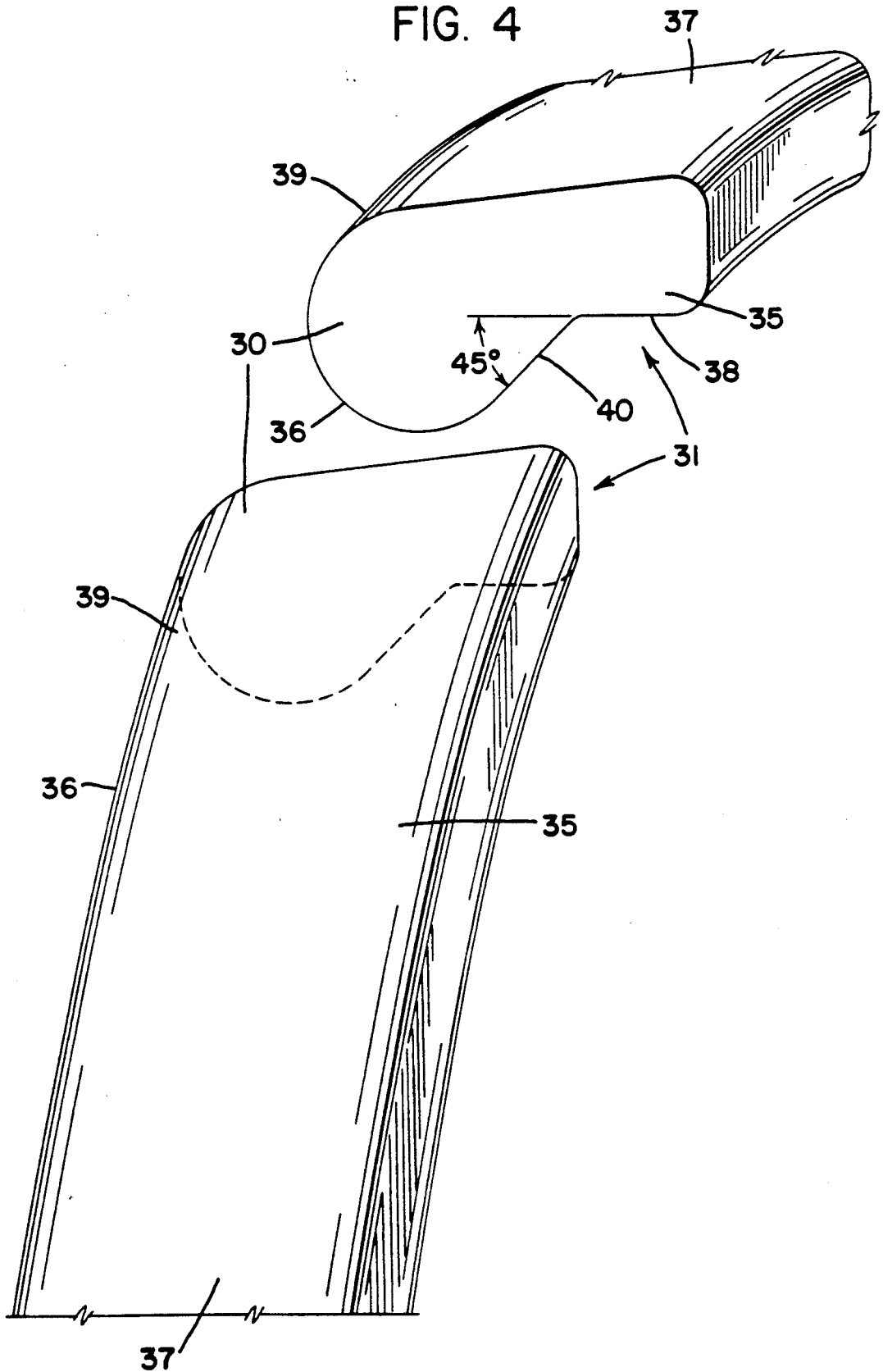
FIG. 4 is an enlarged perspective view of a portion of a lock ring.

Lock ring 31 which is annular in configuration will be described as to its cross sectional shape. As seen in FIGS. 3 and 4 lock ring 31 has leg section 35 and an annular shaped portion or enlarged lobe section 30. Leg section 35 has an outer or upper linear portion 37 and an inner or lower linear portion 38 which portions may be generally parallel to each other (FIG. 3). Lobe section 30 has a curvilinear portion 39 whose one end merges into a linear portion that is coincident with the outer linear portion 37. The other end of curvilinear portion 39 terminates into a linearly extending portion 40 that intersects the lower or inner linear portion 38 of leg section 35. Intersect as used herein means to traverse or cross as where two lines intersect or cross at a point and excludes one line being coincident with another. The linear extension of the lower or inner linear portion 38 makes a 45 degree angle with the linearly extending portion 40 of lobe section 36. Such acute angle between the linear extension of the lower linear portion 38 and the linearly extending portion 40 of lobe section 36 can have a range of dimensions of plus or minus 20 degrees from the forty-five degree angle which forty-five degree angle is the preferred embodiment. The configuration of circumferentially extending groove 20 is complimentary to the configuration of the inner radial portion of the lock ring 31.

In assembling the wheel or wheel assembly, the uninflated pneumatic tire is slid onto the wheel base 10, after which the side rim 11 is slid onto the wheel base 10 with the rim member 25 beyond the grooves 19 and 20. A sealing gasket 45 is mounted within groove 19 and thence split lock ring 31 is positioned into groove 20. The pneumatic tire is then inflated and the respective beads of the tire exert a separating force on the respective rim members 18 and 25, which exerts the force to move the side rim 11 rightwardly (as viewed in FIG. 1) relative to the wheel base 10, such that the recessed portion 27 of side rim 11 engages the curvilinear portion 39 of lock ring 31 which in turn limits the movement of side rim 11 relative to the wheel base 10. A snap ring 33 is then placed into the circumferentially extending groove 32 in rim section 25 to assure the retention of the lock ring 31 on the wheel under all conditions. With the full pressurization of the tire on the aircraft wheel, the lock ring 31 firmly secures the side rim section 25 on the wheel base 10. As seen in FIG. 3, the pressure from the inflated tire on the side rim section 25 exerts a bearing pressure that is distributed over a linear surface 40 rather than a point contact as heretofore encountered. With such bearing pressure distributed over a greater contact area, there is safety assurance of superior wheel and tire performance.

Figure 5:
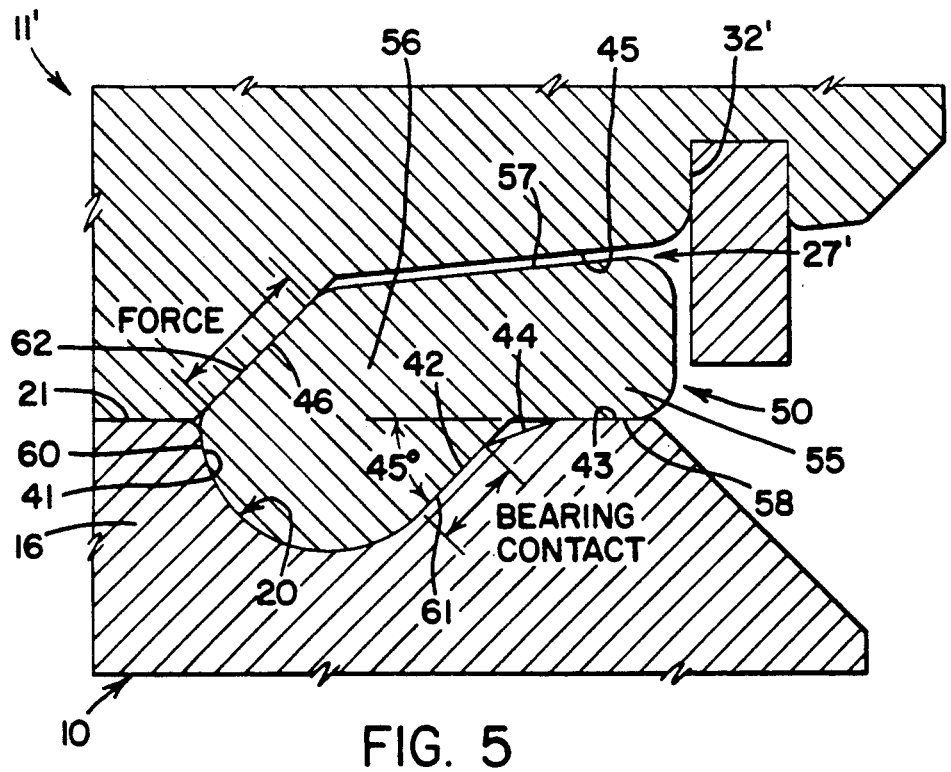
FIG. 5 is an enlarged cross-sectional view of a modified wheel base and side rim structure with a modified lock ring in place.
Figure 6:
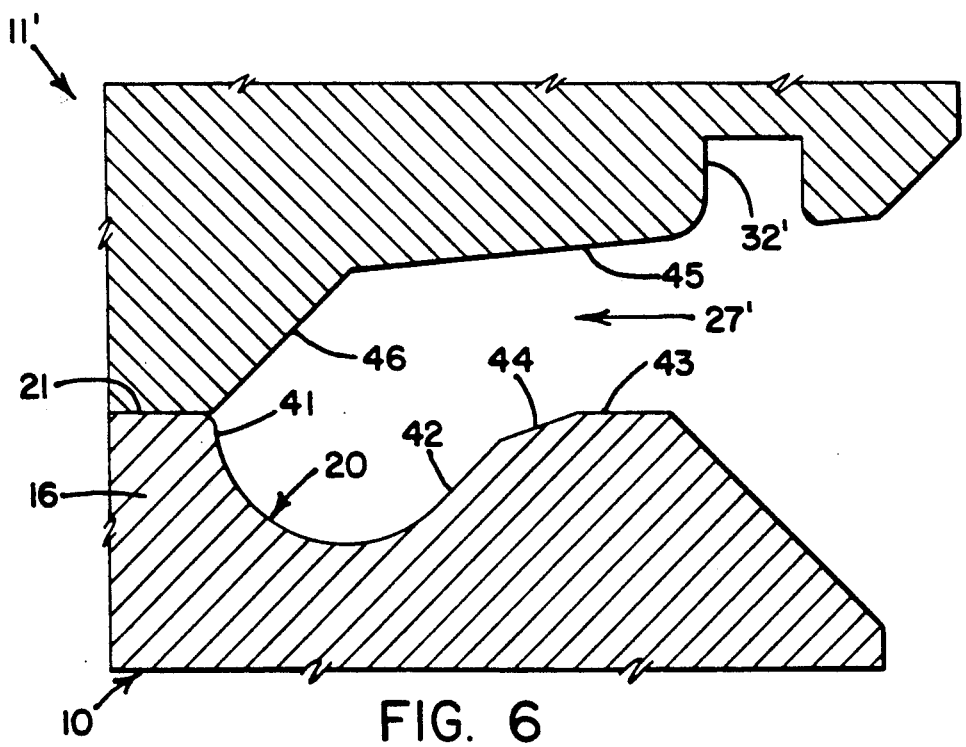
FIG. 6 is a cross-sectional view of the modification of the invention shown in FIG. 5 showing the groove in the wheel base and the recess in the side rim.

A modification of the described invention is shown in FIGS. 5 and 6 wherein the wheel base 10 is identical to the wheel base described above and shown in FIG. 3 with like reference numerals being identical to those described above. Such wheel section 16 of wheel base 10 has the circumferentially extending groove 20 with a curvilinear portion 41, and a linear portion 42 that intersects a linear portion 43 that is the extension of the cylindrical portion designated 21 as described above in reference to FIGS. 1 and 2. The juncture of linear portions 42 and 43 may be beveled as at 44 in FIG. 5. The contour of the recess, groove and lock ring will be described as viewed in their cross-sectional configuration as disclosed in FIGS. 5 and 6.

A cylindrical side rim that is cooperative with the wheel base 10 is designated 11' and is essentially of the same configuration as described above with respect to side rim 11 except for the configuration of a circumferentially extending recess 27' (recess 27 in FIG. 3). Such recess 27' has a linear portion 45 that intersects another linear portion 46, which portion 46 terminates and intersects along a linear extension of the lower or inner radial dimension of the side rim 11' that is complimentary to the generally cylindrical portion designated 21 in FIGS. 1, 2 and 3 of the cylindrical wheel section 16. Such cylindrical side rim 11' also has a circumferentially extending groove 32' that is adjacent to the recessed portion 27' for the reception of a snap ring to retain the lock ring as described in the prior embodiment.

A split lock ring 50 similar in many respects to the lock ring 31 is used to join the side rim 11' and the wheel base 10. Lock ring 50 is an annular one piece metal strip that is split to permit its enlargement and placement over the cylindrical section 21 of wheel base 10 and upon release, springs back for seating into annular groove 20.

Lock ring 50 which is annular in configuration will be described as to its cross-sectional shape. As shown in FIG. 5, lock ring 50 has a leg section 55 and a lobe section 56. Leg section 55 has an outer or upper linear portion 57 and an inner or lower linear portion 58 which portions may be generally parallel to each other (FIG. 6). Lobe section 56 has a curvilinear portion 60 whose one end terminates into a linear portion 61 which intersects the inner or lower linear portion 58 of leg section 55. The other end of curvilinear portion 60 terminates into a linear portion 62 which intersects the linear extension of linear portion 57 of leg section 55. The respective linear portions 62 and 61 of lobe section 56 are generally parallel to each other. The linear extension of the upper or outer linear portion 57 makes a 45 degree angle with the linear portion 62 of lobe section 56. Such acute angle between the linear extension of linear portion 57 and the linear portion 62 can have a range of dimensions of plus or minus 20 degrees from the forty-five degree angle which forty-five degree angle is the preferred embodiment. A modification of the invention is to have the lobe section of the lock ring with the linear portion 62 and the curvilinear portion 60 continue to curve until it intersects the lower linear portion of the leg section 55 (similar to that shown in FIG. 2 for the curvilinear portion). In this case the groove of the wheel base 10 and the annular recess 27' of the side rim would compliment the configuration of the lock ring.

Various modifications are contemplated and may obviously be resorted to by those skilled in the art without departing from the described invention, as hereinafter defined by the appended claims, as only a preferred embodiment thereof has been disclosed.

We claim:

1. An annular locking ring for an aircraft wheel assembly with an axial center line, said locking ring having an annular lobe section and an annular leg section, said sections merge into each other to form an integral unitary structure, the cross sectional shape of said leg section has a pair of spaced linear portions that define an outer linear portion and an inner linear portion relative to said center line, the cross sectional shape of said lobe section has a curvilinear portion and a linearly extending portion, said curvilinear portion has one end merging with one end of said outer linear portion, the other end of said curvilinear portion merges with one end of said linearly extending portion of said lobe section, the other end of said linearly extending portion of said lobe section intersects one end of said inner linear portion of said leg section, and said lobe section having a diameter that is greater in dimension than the distance between said pair of spaced linear portions of said leg section.

2. An annular locking ring as set forth in claim 1 wherein the linear extension of said one end of said inner linear portion of said leg section makes an acute angle with said linearly extending portion of said lobe section.

3. An annular locking ring as set forth in claim 2 wherein said acute angle is approximately forty five degrees.

4. An annular locking ring as set forth in claim 2 wherein said acute angle has a range between 35 degrees and 55 degrees.

5. An annular locking ring as set forth in claim 2 wherein said acute angle has a range between 25 degrees and 65 degrees.

6. An annular locking ring as set forth in claim 2 wherein said outer linear portion of said leg section is of substantial greater linear length than said inner linear portion of said leg section.

7. An annular locking ring as set forth in claim 6 wherein said spaced linear portions of said leg section are generally parallel to each other.

8. An annular locking ring as set forth in claim 7 wherein the linear length of said linearly extending portion of said lobe section is substantially equal to the linear length of said inner linear portion of said leg section.

9. An annular locking ring as set forth in claim 8 wherein said acute angle is approximately forty-five degrees.

10. An annular locking ring as set forth in claim 8 wherein said acute angel has a range between 35 degrees and 55 degrees.

11. An annular locking ring as set forth in claim 8 wherein said acute angle has a range between 25 degrees and 65 degrees.

12. An aircraft tire wheel assembly comprising a pair of wheel members with an axial center line, each wheel member having a rim member for abutting the spaced beads of a pneumatic tire, an annular groove in one said wheel members, an annular recess in the other one of said wheel members, said groove having an arcuate portion and a linear portion in transverse cross-section, a lock ring mounted in said groove and extending into said recess, said lock ring having a lobe section and a leg section, the cross-sectional shape of said leg section having an outer linear portion and an inner linear portion, the cross-sectional shape of said lobe section has a curvilinear portion and a linear portion, one end of said curvilinear portion merges with said outer linear portion, said linear portion of said lobe section intersects said inner linear portion, and said groove in said one wheel member is complimentary in shape to that portion of said lock ring that has said curvilinear portion and said linear portion that intersects said inner linear portion of said leg section.

13. An aircraft tire wheel assembly as set forth in claim 12 wherein the linear extension of said inner linear portion of said leg section from the intersection of said inner linear portion with said linear portion of said lobe section makes an acute angle with said linear portion of said lobe section.

14. An annular locking ring for an aircraft wheel assembly comprising a lobe section and a leg section, the cross-sectional shape of said leg section has a pair of spaced linear portions, the cross-sectional shape of said lobe section has a curvilinear portion and a pair of spaced linearly extending portions, one of said pair of linear portions of said lobe section is a first linear portion and the other one of said pair of linear portions is a second linear portion, said curvilinear portion has one end that merges into one end of said first linear portion, the other end of said first linear portion intersects one end of one of said spaced linear portions of said leg section, the other end of said curvilinear portion terminates into one end of said second linear portion, the other end of said second linear portion of said lobe section intersects the extension of the other one of said spaced linear portions of said leg section, and said lobe section having a cross section that is greater in dimension than the distance between said pair of spaced linear portions of said leg section as measured along a line that is normal to one of said spaced linear portions of said leg section.

15. An annular locking ring as set forth in claim 14 wherein said pair of spaced linearly extending portions of said lobe sections are generally parallel to each other.

16. An annular locking ring as set forth in claim 15 wherein the extension of said pair of spaced linearly extending portions of said leg section make an acute angle with said linearly extending portions of said lobe section.

17. An annular locking ring as set forth in claim 16 wherein said acute angle is approximately forty-five degrees.

18. An annular locking ring as set forth in claim 16 wherein said acute angle has a range between 40 degrees and 50 degrees.

19. An aircraft tire wheel assembly comprising a pair of wheel members with an axial center line, each wheel member having a rim member for abutting the spaced beads of a pneumatic tire, an annular groove in one of said wheel members, a recess in the other one of said wheel members, said annular groove having an arcuate portion and a linear portion in cross section, said recess having a first linear portion and a second linear portion in cross section, a lock ring mounted in said groove and extending into said recess, said lock ring having a lobe section and a leg section, the cross-sectional shape of said leg section having an outer linear portion and an inner linear portion, said outer linear portion of said leg section abuttingly engages said second linear portion, the cross-sectional shape of said lobe section having a curvilinear portion and a pair of spaced linear portions, said curvilinear portion abuttingly engages said arcuate portion, one of said spaced linear portions of said lobe section abuttingly engages said linear portion of said groove, the other one of said pair of linear portions of said lobe section abuttingly engages said first linear portion of said recess.

20. An aircraft tire wheel assembly as set forth in claim 19 wherein said pair of spaced linear portions of said lobe section are generally parallel to each other.

21. An aircraft tire wheel assembly as set forth in claim 20 wherein said spaced linear portions of said lobe section make approximately a forty-five degree angle with the respective linear extensions of said outer linear portion and said inner linear portion of said leg member.

22. An aircraft tire wheel assembly comprising a cylindrical wheel, said wheel having a pair of rim member means for abutting the spaced beads of a pneumatic tire, an annular groove in one of said rim member means, a recess in the other one of said rim member means, said annular groove having an arcuate portion in cross section, said recess having a first linear portion and a second linear portion in cross section, a lock ring mounted in said groove and extending into said recess, said lock ring having a lobe section and a leg section, the cross-sectional shape of said leg section having an outer linear portion and an inner linear portion, said outer linear portion of said leg section abuttingly engages said second linear portion, the cross-sectional shape of said lobe section having a curvilinear portion and a linear portion, said curvilinear portion abuttingly engages said arcuate portion of said groove, said linear portion of said lobe section abuttingly engages said first linear portion of said recess.

23. An aircraft tire wheel assembly as set forth in claim 22 wherein said arcuate portion is semi-circular in cross-sectional shape.

24. An aircraft tire wheel assembly as set forth in claim 22 wherein the extension of said second linear portion of said recess makes an acute angle with said first linear portion of said recess.

25. An aircraft tire wheel assembly as set forth in claim 24 wherein said acute angle is approximately forty-five degrees.

* * * * *